Patented May 15, 1951

2,553,355

UNITED STATES PATENT OFFICE 2,553,355

METHOD OF PRODUCING PARASITICIDAL OILS

Richard C. Brandon, Elizabeth, and Minor C. K. Jones, Westfield, N. J., assignors to Standard Oil Development Company, a corporation of Delaware No Drawing. Application August 29, 1947, Serial No. 771,388

5 Claims. (Cl. 196—147)

This invention relates to parasiticidal oils, more particularly to parasiticidal oils containing dissolved relatively high proportions of insecticides, and to methods of preparing these oils from inexpensive, cracked petroleum products.

There has grown up during recent years a great demand for normally gaseous unsaturated hydrocarbons such as ethylene and butadiene. Intensive cracking processes have been developed for converting large proportions of petroleum feed stock to these gases. These cracking processes are carried on at temperatures between 1100–1500° F. in the presence of steam, at low pressures, i. e., 1, 2, or several atmospheres. These processes also yield naphtha distillates that contain considerable amounts of aromatic compounds mixed with unstable, unsaturated hydrocarbons. A heavy tar and a cycle gas oil, or intermediate distillate fraction, which contain considerable amounts of aromatic and unstable hydrocarbons, are also obtained in these steam-cracking processes.

The complexity and instability of the cycle gas oils formed by intensive cracking make them difficult to use in the same manner as ordinary cycle stocks. Only a small portion of the higher unstable cycle gas oils can be satisfactorily recycled for intensive recracking. Often none are recycled. The cycle oil contains so much material reactive with sulfuric acid that acid treats of even larger than customary size are not effective to render them suitable for further conventional processing. Large quantities of the highly cracked gas oils consequently have to be withdrawn from the cracking system. They are unsatisfactory for use as insecticides because of their color, unpleasant odor and undesirable phytocidal activity. Even after acid treatment, the remaining unsaturates and other undesirable compounds render the oil unsatisfactory for horticultural use. It has been a subject of wide research to find methods of treating these cycle gas oils so as to obtain commercially useful products.

One of the objects of this invention is to provide a new and improved horticultural oil. Another object is to provide an improved spray oil composition. Another object is to provide a new solvent for other valuable insecticides. Still another object is to provide a practical method of treating this hitherto valueless cycle gas oil so as to obtain these valuable products.

It has now been found that by closely controlling the conditions, a process utilizing a catalytic polymerization treatment, preferably followed by other refining, yields stable horticultural oils from unstable cycle gas oils boiling in the temperature range from 350–700° F.

In accordance with this invention, the cycle gas oil is treated with, for example, active clay, at a temperature range from 400–600° F. under a pressure of 25–400 p. s. i. absolute and at a contact rate of 0.2–2.0 volumes of oil per volume of the clay per hour. The cycle gas oil preferably is percolated through the fixed bed of the catalytically active clay at the specified conditions, but may be reacted with the clay by a contact process. The oil filters down through the clay, which can by grannular or lumpy. The liquid product separated from the clay is rerun to recover the distillate as an overhead product.

The clay is of an adsorptive type which is catalytically active for promoting polymerization of the unsaturates present in the cycle gas oil. Attapulgus clay, fuller's earth, heat activated clays, zeolites and acid treated clays may be used.

The clay-treated oil product may then be further refined by sulfuric acid treatment or, if a more aromatic product is desired, by liquid sulfur dioxide extraction.

To better illustrate the method of operation of this invention, the following description of a preferred embodiment is given.

A cycle gas oil from the previously described petroleum cracking operation was clay-treated at 550° F., 100 lbs. pressure and .25 volume of oil per volume of active clay per hour feed rate. The clay-treated oil was caustic washed and rerun to separate 85% of the oil as overhead, and 15% as heavy residue. Data on the clay treatment follow:

Clay treatment

| | Feed | Product |
|---|---|---|
| Gravity A. P. I. | 23.4 | 29 |
| Aniline Point, ° F. | 56 | 98 |
| Diesel Index | 13.1 | 29 |
| Acid Heat A. S. T. M. ° F. | 104 | 23 |
| Phenol number mg./100 ml. equiv. to amyl phenol | 7,500 | 100 |
| Bromine number, cg./g. | 29.2 | 16 |
| Diene number, cg./g. | 5.1 | 0.5 |
| Fractional Distillation: | | |
| 400–500° F., percent | 60 | 31 |
| 500–600° F., percent | 34 | 49 |

One portion of the clay-treated oil taken overhead was treated with 20 lbs. of 98% sulfuric acid per bbl. and redistilled to 90% overhead to separate the oil from residual products.

Another portion of the clay-treated oil was treated with liquid sulfur dioxide, giving an extract yield of 48%, which was rerun under vacuum with a limiting still temperature up to 425° F. to 90% overhead. This material exhibited a specific dispersion of 182 and a specific gravity of above 0.9.

The color and odor are greatly improved by the clay treating. Additional improvement was obtained by either of the two other refining steps listed above and both characteristics are rendered entirely satisfactory.

The oils obtained are very complex mixtures and extremely difficult to analyze chemically. They are highly aromatic, but may contain some paraffins, olefins and naphthenes.

These oils obtained by the hereinbefore described treatment exhibit excellent parasiticidal properties when used either alone or in mineral spray oils, and exhibit none of the undesirable phytocidal activity of the oil before clay treating. These refined oils are toxic toward insects and arachnids and the like.

In addition, oils prepared by the methods of this invention are excellent solvents for dichlorodiphenyl trichlorethanes, particularly DDT, which is known to be toxic to a wide variety of household and garden insects. These oils can thus be used as a sole, major, or minor vehicle for various insecticides.

DDT is ordinarily prepared in 5% solutions of deodorized kerosene. A solution of that strength is virtually saturated. In addition, slight decreases in atmospheric temperature result in substantial crystallization of the DDT out of solution.

The solubility of commercial DDT in the clay-treated oil is 30% and this solubility increases with the additional described refining treatments. In addition, these oils exhibit excellent DDT low temperature retention characteristics. These oils can thus be used as a co-solvent for DDT to increase its solubility in the conventional hydrocarbon oils, or in either of the two conventional dispersion means for DDT, i. e., 5% spray oil compositions and emulsion concentrates.

Typical formulations for each type of dispersion means follow:

*DDT spray oil composition*

5% DDT
15% clay-treated acid-treated cycle gas oil
80% mineral spray oil

*DDT emulsion concentrate*

26% DDT
69% clay-treated acid-treated cycle gas oil
5% emulsifier

Preferred mineral spray oils are the petroleum white oils or lubricating oil fractions such as medium or light lubricating oils, transformer oil, machine oil, deodorized kerosene, etc. These oils may be replaced in part or in whole by vehicles such as hydrogenated hydrocarbons, paraffin oils, naphthalene, chlorinated hydrocarbons, acetone, chlorinated ethers, or the like, or mixtures thereof.

The following may be used by way of example as suitable emulsifiers: various soaps, such as sodium resinate, sodium oleate, triethanolamine soaps, sulfonated and sulfated preparations, protein preparations, such as casein, egg albumen, casein-lime, casein-ammonia, fatty acid esters, amine salts, and the like, or mixtures thereof.

The conditions of the treatment for obtaining the horticultural oils of this invention have to be carefully controlled to obtain the desired characteristics. Divergence from these above-mentioned conditions results in unsatisfactory products. The pressure is variable but should be kept sufficient to maintain the oil in liquid phase during treatment.

The invention is not intended to be limited by the specific examples which have been given to illustrate preferred embodiments. Various changes may be made within the scope of this invention as defined in the appended claims.

We claim:

1. A method of producing a parasiticidal oil which comprises clay-treating a highly unstable cycle gas oil boiling in the range of 350°–700° F., said cycle gas oil having been produced by low pressure steam cracking of petroleum gas oil at 1100°–1500° F., the clay-treating being carried out by contacting the cycle gas oil in the liquid phase with clay at 400°–600° F. and distilling from the thus clay-treated cycle gas oil a distillate of substantially enhanced stability.

2. The method as described in claim 1 wherein said clay-treated cycle gas oil is distilled to about 85% overhead as said distillate.

3. The method as described in claim 1, wherein the clay-treated cycle gas oil distillate is treated with concentrated sulfuric acid, and the thus acid-treating distillate is then redistilled to separate the 90% overhead distillate product.

4. The method as described in claim 1 wherein said distillate is extracted with liquid sulfur dioxide and the resulting extract is redistilled to about a 90% overhead distillate product.

5. A method of transforming a highly unstable cycle gas oil obtained by steam-cracking of petroleum gas oil under low pressure at 1100°–1500° F. to a stabilized parasiticidal oil, said cycle gas oil being characterized by having a relatively low aniline point of about 56° F., 60% of the cycle gas oil boiling in the range of 400°–500° F. and 34% boiling in the range of 500°–600° F., which comprises passing said gas oil at 400°–600° F. under a pressure of 25–400 pounds per square inch absolute through adsorbent clay at a contact rate of 0.2 to 2.0 volume of oil per volume of the clay per hour, and distilling up to 85% of the cycle gas oil overhead as a distillate product characterized by substantially reduced content of unstable hydrocarbons and elevated aniline point of above 98° F. with reduced volatility so that 31% of the distillate boils in the range of 400°–500° F. and 49% of the distillate boils in the range of 500°–600° F.

RICHARD C. BRANDON.
MINOR C. K. JONES.

REFERENCES CITED

The following references are of record in the file of this patent:

UNITED STATES PATENTS

| Number | Name | Date |
|---|---|---|
| 2,183,781 | Bray | Dec. 19, 1939 |
| 2,189,196 | Carpenter | Feb. 6, 1940 |
| 2,232,761 | Balthis | Feb. 25, 1941 |
| 2,325,581 | Allison et al. | Aug. 3, 1943 |
| 2,361,080 | Bolt et al. | Oct. 24, 1944 |
| 2,388,076 | Phillips | Oct. 30, 1945 |
| 2,420,928 | Bousquet | May 20, 1947 |
| 2,436,340 | Upham et al. | Feb. 17, 1948 |
| 2,473,206 | Jones et al. | June 14, 1949 |

OTHER REFERENCES

Jones: "Solvents for DDT," Soap and Sanitary Chemicals, Nov. 1945, pages 110–115, 155.

Madden: "Fly Larvicide Tests," Soap and Sanitary Chemicals, Mar. 1947, pages 141–143.